(12) United States Patent
Lakhia

(10) Patent No.: US 7,787,378 B1
(45) Date of Patent: Aug. 31, 2010

(54) METHOD AND APPARATUS FOR CONVERSION OF AN ARBITRATION TABLE INTO COUNT VALUES TO CONTROL THE DISTRIBUTION OF RESOURCES

(75) Inventor: Aliasgar Lakhia, San Jose, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 288 days.

(21) Appl. No.: 11/854,495

(22) Filed: Sep. 12, 2007

(51) Int. Cl.
*G01R 31/08* (2006.01)
*G06F 11/00* (2006.01)

(52) U.S. Cl. ...................................... 370/235; 370/392

(58) Field of Classification Search ................. 370/235, 370/392, 230, 230.1, 231, 232
See application file for complete search history.

(56) References Cited

U.S. PATENT DOCUMENTS

2008/0151753 A1* 6/2008 Wynne ........................ 370/235

* cited by examiner

*Primary Examiner*—Derrick Ferris
*Assistant Examiner*—Maharishi Khirodhar
(74) *Attorney, Agent, or Firm*—Heimlich Law, PC; Alan Heimlich, Esq.

(57) ABSTRACT

A method and apparatus for conversion of an arbitration table into count values to control the distribution of resources have been described.

15 Claims, 17 Drawing Sheets

Figure 7-48: Example Port Arbitration Table with 128 Phases and 2-bit Table Entries Table 7-45: Length of Port Arbitration Table

| Port Arbitration Select | Port Arbitration Table Length (in number of Entries) |
|---|---|
| 001b | 32 |
| 010b | 64 |
| 011b | 128 |
| 100b | 128 |
| 101b | 256 |

FIG. 3 (Prior Art)

| Phase 0 port 2 | Phase 1 port 4 | Phase 2 port 4 | Phase 3 port 7 | Phase 4 port 3 | Phase 5 port 3 | Phase 6 port 4 | Phase 7 port 3 |
|---|---|---|---|---|---|---|---|
| Phase 8 port 7 | Phase 9 port 1 | Phase 10 port 6 | Phase 11 port 5 | Phase 12 port 5 | Phase 13 port 4 | Phase 14 port 4 | Phase 15 port 3 |
| Phase 16 port 1 | Phase 17 port 3 | Phase 18 port 3 | Phase 19 port 6 | Phase 20 port 6 | Phase 21 port 7 | Phase 22 port 7 | Phase 23 port 3 |
| Phase 24 port 5 | Phase 25 port 4 | Phase 26 port 3 | Phase 27 port 7 | Phase 28 port 6 | Phase 29 port 4 | Phase 30 port 1 | Phase 31 port 7 |

FIG. 4

| Phase 0 port 2 | Phase 1 port 4 | Phase 2 port 4 | Phase 3 port 7 | Phase 4 port 2 | Phase 5 port 3 | Phase 6 port 4 | Phase 7 port 3 |
|---|---|---|---|---|---|---|---|
| Phase 8 port 7 | Phase 9 port 2 | Phase 10 port 2 | Phase 11 port 2 | Phase 12 port 2 | Phase 13 port 4 | Phase 14 port 4 | Phase 15 port 3 |
| Phase 16 port 2 | Phase 17 port 3 | Phase 18 port 3 | Phase 19 port 2 | Phase 20 port 2 | Phase 21 port 7 | Phase 22 port 7 | Phase 23 port 3 |
| Phase 24 port 2 | Phase 25 port 4 | Phase 26 port 3 | Phase 27 port 7 | Phase 28 port 2 | Phase 29 port 2 | Phase 30 port 2 | Phase 31 port 2 |

FIG. 5

```
// State Machine to convert 32-Phase table to weights/counts.
// This State Machine walks thru the 32-Phase table one entry at a time.

always @(posedge clk or negedge reset_n) begin
    if (!reset_n)   cpc_curr_state[4:0] <= #1 CAL_P0;
    else            cpc_curr_state[4:0] <= #1 cpc_next_state[4:0];
end always @(*) begin
cpc_next_state          = CAL_P0;
sel_phase               = 4'b0;
done_cpc                = 1'b0;
case (cpc_curr_state)
  CAL_P0 : begin
       if (start_phase_convert) begin
         sel_phase                  = phase0;
       // The Port number from the phase table is loaded in to an internal
variable sel_phase
           cpc_next_state           = CAL_P1;
       end
        else begin
          cpc_next_state            = CAL_P0;
       end
  end
  CAL_P1 : begin
      sel_phase                     = phase1;
      cpc_next_state                = CAL_P2;
    end
  CAL_P2 : begin
      sel_phase                     = phase2;
      cpc_next_state                = CAL_P3;
    end
  CAL_P3 : begin
      sel_phase                     = phase3;
      cpc_next_state                = CAL_P4;
    end
  CAL_P4 : begin
      sel_phase                     = phase4;
      cpc_next_state                = CAL_P5;
    end
  CAL_P5 : begin
      sel_phase                     = phase5;
      cpc_next_state                = CAL_P6;
    end
  CAL_P6 : begin
      sel_phase                     = phase6;
      cpc_next_state                = CAL_P7;
    end
  CAL_P7 : begin
      sel_phase                     = phase7;
      cpc_next_state                = CAL_P8;
    end
  CAL_P8 : begin
      sel_phase                     = phase8;
      cpc_next_state                = CAL_P9;
    end
```

FIG. 12A

```
CAL_P9 : begin
    sel_phase           = phase9;
    cpc_next_state      = CAL_P10;
end
CAL_P10 : begin
    sel_phase           = phase10;
    cpc_next_state      = CAL_P11;
end
CAL_P11 : begin
    sel_phase           = phase11;
    cpc_next_state      = CAL_P12;
end
CAL_P12 : begin
    sel_phase           = phase12;
    cpc_next_state      = CAL_P13;
end
CAL_P13 : begin
    sel_phase           = phase13;
    cpc_next_state      = CAL_P14;
end
CAL_P14 : begin
    sel_phase           = phase14;
    cpc_next_state      = CAL_P15;
end
CAL_P15 : begin
    sel_phase           = phase15;
    cpc_next_state      = CAL_P16;
end
CAL_P16 : begin
    sel_phase           = phase16;
    cpc_next_state      = CAL_P17;
end
CAL_P17 : begin
    sel_phase           = phase17;
    cpc_next_state      = CAL_P18;
end
CAL_P18 : begin
    sel_phase           = phase18;
    cpc_next_state      = CAL_P19;
end
CAL_P19 : begin
    sel_phase           = phase19;
    cpc_next_state      = CAL_P20;
end
CAL_P20 : begin
    sel_phase           = phase20;
    cpc_next_state      = CAL_P21;
end
CAL_P21 : begin
    sel_phase           = phase21;
    cpc_next_state      = CAL_P22;
end
CAL_P22 : begin
    sel_phase           = phase22;
    cpc_next_state      = CAL_P23;
end
CAL_P23 : begin
```

```
                sel_phase                   = phase23;
                cpc_next_state              = CAL_P24;
            end
        CAL_P24 : begin
                sel_phase                   = phase24;
                cpc_next_state              = CAL_P25;
            end
        CAL_P25 : begin
                sel_phase                   = phase25;
                cpc_next_state              = CAL_P26;
            end
        CAL_P26 : begin
                sel_phase                   = phase26;
                cpc_next_state              = CAL_P27;
            end
        CAL_P27 : begin
                sel_phase                   = phase27;
                cpc_next_state              = CAL_P28;
            end
        CAL_P28 : begin
                sel_phase                   = phase28;
                cpc_next_state              = CAL_P29;
            end
        CAL_P29 : begin
                sel_phase                   = phase29;
                cpc_next_state              = CAL_P30;
            end
        CAL_P30 : begin
                sel_phase                   = phase30;
                cpc_next_state              = CAL_P31;
            end
        CAL_P31 : begin // Final 31st entry is selected by the State Machine
                sel_phase                   = phase31;
                done_cpc                    = 1'b1;
                cpc_next_state              = CAL_P0;
            end
        default : begin
                sel_phase                   = phase0;
                done_cpc                    = 1'b0;
                cpc_next_state              = CAL_P0;
            end
    endcase
end // Logic which generates a pulse to increment the appropriate fixed counts.
// Evertime the above state machine transitions a state one of the below
// "incr_p*_tc" will pulse.
//
assign incr_p1_tc = (sel_phase == 4'b0001)? 1'b1: 1'b0;
assign incr_p2_tc = (sel_phase == 4'b0010)? 1'b1: 1'b0;
assign incr_p3_tc = (sel_phase == 4'b0011)? 1'b1: 1'b0;
assign incr_p4_tc = (sel_phase == 4'b0100)? 1'b1: 1'b0;
assign incr_p5_tc = (sel_phase == 4'b0101)? 1'b1: 1'b0;
assign incr_p6_tc = (sel_phase == 4'b0110)? 1'b1: 1'b0;
assign incr_p7_tc = (sel_phase == 4'b0111)? 1'b1: 1'b0;

// Phase to Weight/count Counter : The Fixed Counts for all 7 Ports
```

FIG. 12C

```
always @(posedge clk or negedge reset_n) begin
    if (!reset_n)
        p1_p2w_tc[4:0] <= #1 5'b0;
    else if (csr_st0_ch0_lpat)
        p1_p2w_tc[4:0] <= #1 5'b0;
    else if (incr_p1_tc & (p1_p2w_tc[4:0] != 5'b1_1111))
        p1_p2w_tc[4:0] <= #1 p1_p2w_tc[4:0] + 5'b0_0001;
end always @(posedge clk or negedge reset_n) begin
    if (!reset_n)
        p2_p2w_tc[4:0] <= #1 5'b0;
    else if (csr_st0_ch0_lpat)
        p2_p2w_tc[4:0] <= #1 5'b0;
    else if (incr_p2_tc & (p2_p2w_tc[4:0] != 5'b1_1111))
        p2_p2w_tc[4:0] <= #1 p2_p2w_tc[4:0] + 5'b0_0001;
end always @(posedge clk or negedge reset_n) begin
    if (!reset_n)
        p3_p2w_tc[4:0] <= #1 5'b0;
    else if (csr_st0_ch0_lpat)
        p3_p2w_tc[4:0] <= #1 5'b0;
    else if (incr_p3_tc & (p3_p2w_tc[4:0] != 5'b1_1111))
        p3_p2w_tc[4:0] <= #1 p3_p2w_tc[4:0] + 5'b0_0001;
end always @(posedge clk or negedge reset_n) begin
    if (!reset_n)
        p4_p2w_tc[4:0] <= #1 5'b0;
    else if (csr_st0_ch0_lpat)
        p4_p2w_tc[4:0] <= #1 5'b0;
    else if (incr_p4_tc & (p4_p2w_tc[4:0] != 5'b1_1111))
        p4_p2w_tc[4:0] <= #1 p4_p2w_tc[4:0] + 5'b0_0001;
end always @(posedge clk or negedge reset_n) begin
    if (!reset_n)
        p5_p2w_tc[4:0] <= #1 5'b0;
    else if (csr_st0_ch0_lpat)
        p5_p2w_tc[4:0] <= #1 5'b0;
    else if (incr_p5_tc & (p5_p2w_tc[4:0] != 5'b1_1111))
        p5_p2w_tc[4:0] <= #1 p5_p2w_tc[4:0] + 5'b0_0001;
end always @(posedge clk or negedge reset_n) begin
    if (!reset_n)
        p6_p2w_tc[4:0] <= #1 5'b0;
    else if (csr_st0_ch0_lpat)
        p6_p2w_tc[4:0] <= #1 5'b0;
    else if (incr_p6_tc & (p6_p2w_tc[4:0] != 5'b1_1111))
        p6_p2w_tc[4:0] <= #1 p6_p2w_tc[4:0] + 5'b0_0001;
end always @(posedge clk or negedge reset_n) begin
    if (!reset_n)
        p7_p2w_tc[4:0] <= #1 5'b0;
```

FIG. 12D

```
        else if (csr_st0_ch0_lpat)
           p7_p2w_tc[4:0] <= #1 5'b0;
        else if (incr_p7_tc & (p7_p2w_tc[4:0] != 5'b1_1111))
           p7_p2w_tc[4:0] <= #1 p7_p2w_tc[4:0] + 5'b0_0001;
end // Counters are re-loaded when they all reach a count of zero.

assign load_all_p2w_tc = ( (p1_p2w_ctc[4:0] == 5'b0) & (p2_p2w_ctc[4:0] == 5'b0) &
                           (p3_p2w_ctc[4:0] == 5'b0) & (p4_p2w_ctc[4:0] == 5'b0) &
                           (p5_p2w_ctc[4:0] == 5'b0) & (p6_p2w_ctc[4:0] == 5'b0) &
                           (p7_p2w_ctc[4:0] == 5'b0));

// Phase weight current counters Or Running Counters
// Counters decrement everytime the corresponding Port is selected
//
always @(posedge clk or negedge reset_n) begin
    if (!reset_n)
        p1_p2w_ctc[4:0] <= #1 5'b0;
    else if (load_all_p2w_tc & dec_p1_p2w_ctc_q)
        p1_p2w_ctc[4:0] <= #1 (p1_p2w_tc[4:0] - 5'b0_0001);
      else if (load_all_p2w_tc)
        p1_p2w_ctc[4:0] <= #1 p1_p2w_tc[4:0];
    else if (dec_p1_p2w_ctc_q & (p1_p2w_ctc[4:0] != 5'b0))
        p1_p2w_ctc[4:0] <= #1 (p1_p2w_ctc[4:0] - 5'b0_0001);
end always @(posedge clk or negedge reset_n) begin
    if (!reset_n)
        p2_p2w_ctc[4:0] <= #1 5'b0;
    else if (load_all_p2w_tc & dec_p2_p2w_ctc_q)
        p2_p2w_ctc[4:0] <= #1 (p2_p2w_tc[4:0] - 5'b0_0001);
      else if (load_all_p2w_tc)
        p2_p2w_ctc[4:0] <= #1 p2_p2w_tc[4:0];
    else if (dec_p2_p2w_ctc_q & (p2_p2w_ctc[4:0] != 5'b0))
        p2_p2w_ctc[4:0] <= #1 (p2_p2w_ctc[4:0] - 5'b0_0001);
end always @(posedge clk or negedge reset_n) begin
    if (!reset_n)
        p3_p2w_ctc[4:0] <= #1 5'b0;
    else if (load_all_p2w_tc & dec_p3_p2w_ctc_q)
        p3_p2w_ctc[4:0] <= #1 (p3_p2w_tc[4:0] - 5'b0_0001);
      else if (load_all_p2w_tc)
        p3_p2w_ctc[4:0] <= #1 p3_p2w_tc[4:0];
    else if (dec_p3_p2w_ctc_q & (p3_p2w_ctc[4:0] != 5'b0))
        p3_p2w_ctc[4:0] <= #1 (p3_p2w_ctc[4:0] - 5'b0_0001);
end always @(posedge clk or negedge reset_n) begin
    if (!reset_n)
        p4_p2w_ctc[4:0] <= #1 5'b0;
```

```
        else if (load_all_p2w_tc & dec_p4_p2w_ctc_q)
            p4_p2w_ctc[4:0] <= #1 (p4_p2w_tc[4:0] - 5'b0_0001);
        else if (load_all_p2w_tc)
            p4_p2w_ctc[4:0] <= #1 p4_p2w_tc[4:0];
        else if (dec_p4_p2w_ctc_q & (p4_p2w_ctc[4:0] != 5'b0))
            p4_p2w_ctc[4:0] <= #1 (p4_p2w_ctc[4:0] - 5'b0_0001);
end always @(posedge clk or negedge reset_n) begin
    if (!reset_n)
        p5_p2w_ctc[4:0] <= #1 5'b0;
    else if (load_all_p2w_tc & dec_p5_p2w_ctc_q)
        p5_p2w_ctc[4:0] <= #1 (p5_p2w_tc[4:0] - 5'b0_0001);
    else if (load_all_p2w_tc)
        p5_p2w_ctc[4:0] <= #1 p5_p2w_tc[4:0];
    else if (dec_p5_p2w_ctc_q & (p5_p2w_ctc[4:0] != 5'b0))
        p5_p2w_ctc[4:0] <= #1 (p5_p2w_ctc[4:0] - 5'b0_0001);
end always @(posedge clk or negedge reset_n) begin
    if (!reset_n)
        p6_p2w_ctc[4:0] <= #1 5'b0;
    else if (load_all_p2w_tc & dec_p6_p2w_ctc_q)
        p6_p2w_ctc[4:0] <= #1 (p6_p2w_tc[4:0] - 5'b0_0001);
    else if (load_all_p2w_tc)
        p6_p2w_ctc[4:0] <= #1 p6_p2w_tc[4:0];
    else if (dec_p6_p2w_ctc_q & (p6_p2w_ctc[4:0] != 5'b0))
        p6_p2w_ctc[4:0] <= #1 (p6_p2w_ctc[4:0] - 5'b0_0001);
end always @(posedge clk or negedge reset_n) begin
    if (!reset_n)
        p7_p2w_ctc[4:0] <= #1 5'b0;
    else if (load_all_p2w_tc & dec_p7_p2w_ctc_q)
        p7_p2w_ctc[4:0] <= #1 (p7_p2w_tc[4:0] - 5'b0_0001);
    else if (load_all_p2w_tc)
        p7_p2w_ctc[4:0] <= #1 p7_p2w_tc[4:0];
    else if (dec_p7_p2w_ctc_q & (p7_p2w_ctc[4:0] != 5'b0))
        p7_p2w_ctc[4:0] <= #1 (p7_p2w_ctc[4:0] - 5'b0_0001);
end // The below controls which Ports have counts left over to proceed assign p1_p2w_tc_avail = (p1_p2w_ctc[4:0] != 5'b0) & phase_arb_en;
assign p2_p2w_tc_avail = (p2_p2w_ctc[4:0] != 5'b0) & phase_arb_en;
assign p3_p2w_tc_avail = (p3_p2w_ctc[4:0] != 5'b0) & phase_arb_en;
assign p4_p2w_tc_avail = (p4_p2w_ctc[4:0] != 5'b0) & phase_arb_en;
assign p5_p2w_tc_avail = (p5_p2w_ctc[4:0] != 5'b0) & phase_arb_en;
assign p6_p2w_tc_avail = (p6_p2w_ctc[4:0] != 5'b0) & phase_arb_en;
assign p7_p2w_tc_avail = (p7_p2w_ctc[4:0] != 5'b0) & phase_arb_en;
```

FIG. 12F

METHOD AND APPARATUS FOR CONVERSION OF AN ARBITRATION TABLE INTO COUNT VALUES TO CONTROL THE DISTRIBUTION OF RESOURCES

FIELD OF THE INVENTION

The present invention pertains to arbitration of conflicting resource requests. More particularly, the present invention relates to a method and apparatus for Conversion of an Arbitration Table into Count Values to Control the Distribution of Resources.

BACKGROUND OF THE INVENTION

Arbitration of resources is often required in circuits and systems. Sometimes arbitration is required where multiple entities are attempting to gain access to another entity and there is insufficient bandwidth to handle all the resource requests simultaneously. This presents a problem.

For example, in devices and applications using the PCI Express Bus™, the PCI Express specification provides for arbitration of Virtual Channels (VCs). (PCI Express and PCI-SIG are trademarks of PCI-SIG.)

As an arbitration table grows in size the resulting hierarchy of comparators required in hardware to form a state machine grows in an order of magnitude (big Oh) other than linear. Thus many more gates are needed to implement a state machine as the arbitration table grows in size, additionally, the additional gates and/or machine states, have associated delays and so arbitration latency may be affected. This presents a problem.

The PCI Express™ Base Specification Revision 1.1 dated Mar. 28, 2005 ("PCIe Spec") is hereby incorporated by reference.

RR denotes Round Robin. WRR denotes Weighted Round Robin. VC denotes Virtual Channel. RCRB denotes Root Complex Register Block.

Port Arbitration Table functionality as stated/described in PCI Express Base Specification Rev1.1 is (PCIe Spec at 7.11.10):

The Port Arbitration Table register is a read-write register array that is used to store the WRR or time-based WRR arbitration table for Port Arbitration for the VC resource. This register array is valid for all Switch Ports, Root Ports that support peer to peer traffic, and RCRBs, but not for Endpoint devices. It is only present when one or more asserted bits in the Port Arbitration Capability field indicate that the device supports a Port Arbitration scheme that uses a programmable arbitration table. Furthermore, it is only valid when one of the above mentioned bits in the Port Arbitration Capability field is selected by the Port Arbitration Select field.

The Port Arbitration Table represents one Port arbitration period. FIG. 7-48 shows the structure of an example Port Arbitration Table with 128 phases and 2-bit table entries. Each table entry containing a Port Number corresponds to a phase within a Port arbitration period. For example, a table with 2-bit entries can be used by a Switch component with up to four Ports. A Port Number written to a table entry indicates that the phase within the Port Arbitration period is assigned to the selected PCI Express Port (the Port Number must be a valid one).

When the WRR Port Arbitration is used for a VC of any Egress Port, at each arbitration phase, the Port Arbiter serves one transaction from the Ingress Port indicated by the Port Number of the current phase. When finished, it immediately advances to the next phase. A phase is skipped, i.e., the Port Arbiter simply moves to the next phase without delay, if the Ingress Port indicated by the phase does not contain any transaction for the VC (note that a phase cannot contain the Egress Port's Port Number).

When the Time-based WRR Port Arbitration is used for a VC of any given Port, at each arbitration phase aligning to a virtual timeslot, the Port Arbiter serves one transaction from the Ingress Port indicated by the Port Number of the current phase. It advances to the next phase at the next virtual timeslot. A phase indicates an "idle" timeslot, i.e., the Port Arbiter does not serve any transaction during the phase, if
   the phase contains the Egress Port's Port Number, or
   the Ingress Port indicated by the phase does not contain any transaction for the VC.

The Port Arbitration Table Entry Size field in the Port VC Capability register determines the table entry size. The length of the table is determined by the Port Arbitration Select field as shown in Table 7-45.

When the Port Arbitration Table is used by the default Port Arbitration for the default VC, the default values for the table entries must contain at least one entry for each of the other PCI Express Ports of the device to ensure forward progress for the default VC for each Port. The table may contain RR or RR-like fair Port Arbitration for the default VC.

For example, FIG. 3 illustrates an approach 300 as shown in the PCI Express™ Base Specification Revision 1.1 dated Mar. 28, 2005 at page 434 in FIG. 7-48: Example Port Arbitration Table with 128 Phases and 2-bit Table Entries and Table 7-45: Length of Port Arbitration Table. As may be seen the table can grow in size as well as the table entries may grow in size.

For example, FIG. 4 illustrates a current approach for a Port Arbitration Table with 32 Phases and 3 bits (i.e. 8 ports addressable). In this example, the Phase and corresponding port for that phase are shown. The phase thus indicates the next Ingress Port. If the Ingress Port indicated by the phase did not contain any transaction for the VC, then in the worst possible scenario it would have to skip 31 phases to select the Ingress Port which was able to proceed. This adds extra latency (e.g. clock cycles) to the implementation. For example, in FIG. 4, assume that at Phase 0 port 2 has two transactions to process, and all other ports have no transaction for the VC, then it can process one transaction at Phase 0, however, it must then step through all other phases (Phase 1-31) before it can process the second transaction. This presents a problem.

BRIEF DESCRIPTION OF THE DRAWINGS

The invention is illustrated by way of example and not limitation in the figures of the accompanying drawings in which:

FIG. 3 illustrates a current approach;

FIG. 4 illustrates a current approach for a Port Arbitration Table with 32 Phases and 3 bits (i.e. 8 ports addressable);

FIG. 5 is a Port Arbitration Table with 32 Phases and 3 bits (i.e. 8 ports addressable) used to illustrate embodiments of the current invention;

FIGS. 12A-F illustrates one embodiment of the invention showing RTL (register transfer level) code.

DETAILED DESCRIPTION

This design, as exemplified in various embodiments of the invention, illustrates a method and apparatus for conversion of an arbitration table into count values to control the distribution of resources.

To illustrate the method and apparatus of the current invention, reference to one embodiment or specific embodiments may be used to describe the invention. The invention is not so limited and one of skill in the art will appreciate that the approach and techniques described may be used for arbitration and allocation of resources in general. Nor is the invention limited to electrical circuits, one of skill in the art will appreciate that other the invention may be practiced in other ranges of wavelength, for example, optical.

In one embodiment the invention converts a 32-Phase Weighted Round Robin (WRR) Table into 5-bit count values to control the distribution of bandwidth.

In one embodiment of the invention, the Port Arbitration table may exist only for the Upstream Port and the size of the Port Arbitration table is 4-bits. It uses weighted round robin with 32-phases. Software programs the 32-bit Phase Table with port IDs for the corresponding port arbitration period. It would set the Port Arbitration Select field in the VC Resource 0 Control register to 001b. Then it would write to the Load Port Arbitration Table bin in the VC Resource 0 Control register. This would trigger a State Machine in the Arbitration logic to start converting the 32-Phase Table into internal count values.

In one embodiment the ARBITRATION logic contains seven 5-bit counters for ports 1 to 7. The 32-Phase to Count State Machines contains 32 States. It walks through the 32-Phase Table one phase at a time. Depending on the port ID it encounters in each phase it increments one of the seven 5-bit counters. If a certain enabled Port does not have its port ID in any of the 32-Phase its final count value would be 00000b and traffic from this port going Upstream would be starved.

By converting the 32-WRR phase table into counts/weights it eliminates the need to have a hierarchy of comparators. This saves gates (silicon) and simplifies the logic for selecting the next Ingress Port. For example, in the original scheme of using the WRR, if the Ingress Port indicated by the phase did not contain any transaction for the VC then in the worst possible scenario it would have to skip 31 phases to select the Ingress Port which was able to proceed. This adds extra latency (clock cycles) to the implementation.

FIG. 5 is a Port Arbitration Table, generally at 500, with 32 Phases and 3 bits (i.e. 8 ports addressable) used to illustrate embodiments of the current invention.

Figure 6:
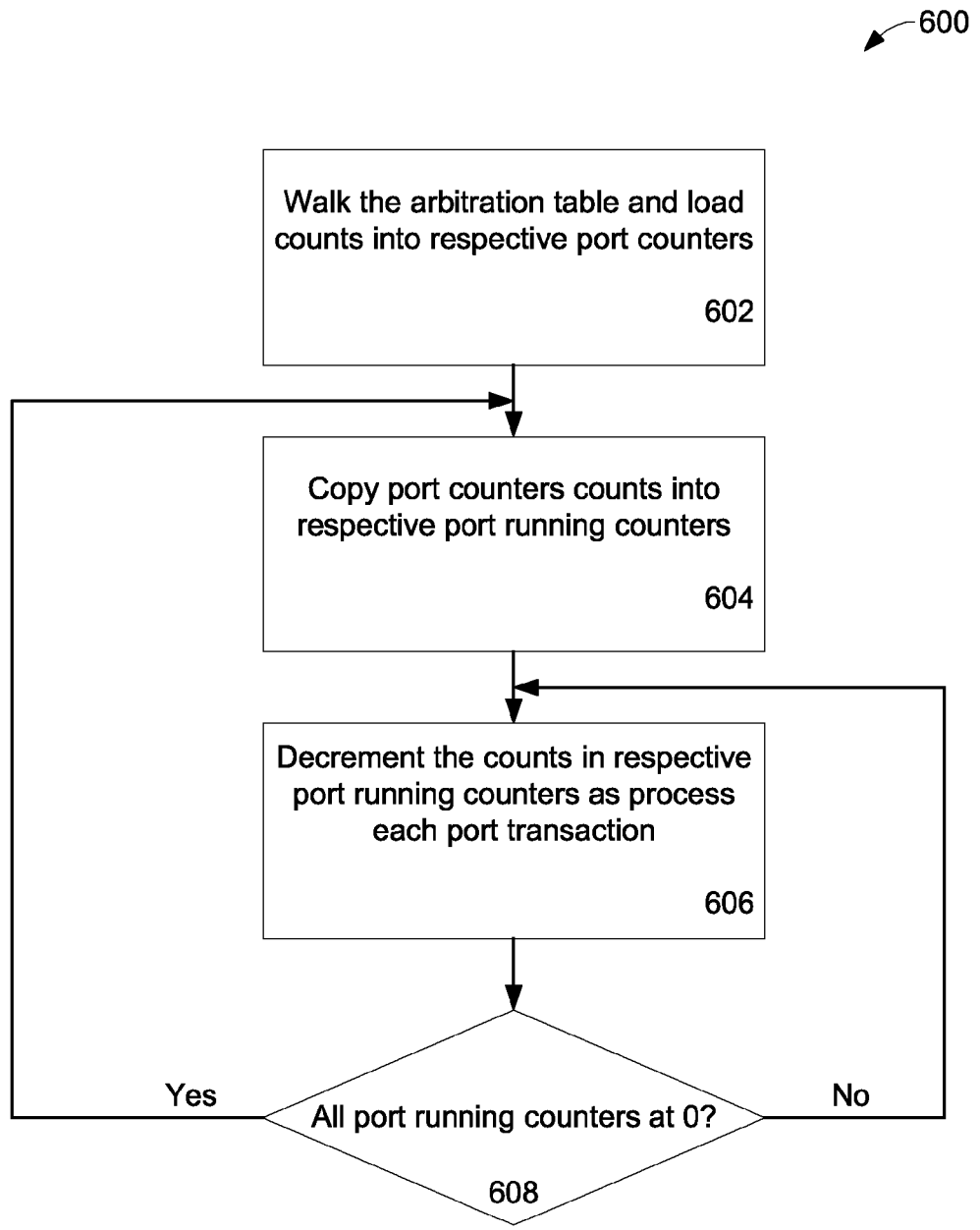
FIG. 6 illustrates one embodiment of the invention showing a top level overview.

FIG. 6 illustrates, generally at 600, one embodiment of the invention showing a top level overview. At 602 the arbitration table is walked and respective counts for each port are loaded into a port counter. For example, if using the arbitration table as illustrated in FIG. 5, walking the table (all 32 phases) would result in the following counts for each of the ports:

| Port | Count |
| --- | --- |
| Port 1 | 0 |
| Port 2 | 14 |
| Port 3 | 7 |
| Port 4 | 6 |
| Port 5 | 0 |
| Port 6 | 0 |
| Port 7 | 5 |

This Table Count will be denoted tc for each port as follows for a 5 bit counter ($2^5$=32 maximum possible entries (e.g. all being a single port)):

p1_tc[4:0]=00000b [0]
p2_tc[4:0]=01110b [14]
p3_tc[4:0]=00111b [7]
p4_tc[4:0]=00110b [6]
p5_tc[4:0]=00000b [0]
p6_tc[4:0]=00000b [0]
p7_tc[4:0]=00101b [5]

In one embodiment of the invention a state machine may be used to walk the phase table and do the port counter loads. For example, all port counters could be cleared initially and then the state machine examines each phase entry as it walks the table and increments the respective port counter. When the 32-Phase to Count State Machine completes walking through all the 32-entries the above 5-bit counters would hold their value and the arbitration logic could clear the Port Arbitration Table Status bit in the VC Resource 0 Status register indicating to software that the arbitration logic has completed loading in the table. (E.g. PCIe Spec 7.11.8.) The above mentioned counts p*_tc (* denoting range 1-7) hold their value until another load of the Port Arbitration Table occurs. The above counts are also transferred to their respective running count registers as shown below.

At 604 the table counts for each port are copied to respective port running counters. Note that the table counts are not cleared and remain static until the phase table is again walked at some later time. This Running Count will be denoted rc for each port. After the load of the table counts to the respect running counts we have the following:

p1_rc[4:0]=00000b [0]
p2_rc[4:0]=01110b [14]
p3_rc[4:0]=00111b [7]
p4_rc[4:0]=00110b [6]
p5_rc[4:0]=00000b [0]
p6_rc[4:0]=00000b [0]
p7_rc[4:0]=00101b [5]

In the above example ports 2, 3, 4, and 7 are able to send traffic, for example, to an Upstream Port.

Now, continuing the example, if all ports 2, 3, 4, and 7 have enough data in their ingress buffers and enough far end credits are available for all the packets to make it to the Upstream Port the Upstream Port Arbitration State Machine would Round Robin through the Ports decrementing the current counts for the selected ports from which a packet is transferred.

For example on the first pass of the round robin of the running counts the following transfers would occur and the counts are as noted:

p2_rc [4:0]=[13] P2-to-P0 transfer
p3_rc [4:0]=[7]
p4_rc [4:0]=[6]
p7_rc [4:0]=[5]
p2_rc [4:0]=[13]
p3_rc [4:0]=[6] P3-to-P0 transfer p4_rc [4:0]=[6]
p7_rc [4:0]=[5]
p2_rc [4:0]=[13]
p3_rc [4:0]=[6]
p4_rc [4:0]=[5] P4-to-P0 transfer
p7_rc [4:0]=[5]
p2_rc [4:0]=[13]
p3_rc [4:0]=[6]
p4_rc [4:0]=[5]
p7_rc [4:0]=[4] P7-to-P0 transfer Now on subsequent passes this would continue until respective counters hit 0 at which point all the transfers for that port had been effected. So the above continues on until Port 7 running count reaches zero as it starts with a count of only 5 (Port 7 starts with the lowest count of all ports in this example and so in the round robin is the first to hit 0). Then the port arbitration logic (e.g. a state machine) round robins between ports 2, 3, and 4 until Port 4 reaches zero and finally the port arbitration logic (e.g. a state machine) can only select port 2 until its current count reaches zero. When all the above running counts reach zero the running counts are re-loaded from the respective original port table counts.

The decrementing of the respective port running counters as each port transaction is process is illustrated at 606. At 608 a check is made to see if all the port running counters have reached 0 (zero), if they have not then the processing and decrementing continues at 606, if the all running port counters are at 0, then at 604 they are reloaded with the respective port running counts 604 and the processing starts over 606.

One of skill in the art will appreciate that the approach disclosed scales in a linear fashion. For example to expand from 8 ports to 16 ports only requires 8 more table count registers and 8 more running count registers.

Now in another scenario, say after a couple of transfers, port 7's running count is zero and only ports 2, 3, and 4 have a non-zero running count. Now if the only valid candidate the arbitration logic receives from a Downstream Port requesting service is for a P7-to-P0 transfer, this would cause the running counts to be re-loaded and P7-to-P0 transfer would then be allowed to proceed. That is, the running counts only decrement if a valid transfer is selected and processed by the arbitration logic. One of skill in the art will appreciate that this technique provides a non-blocking approach to transfers.

Figure 7:
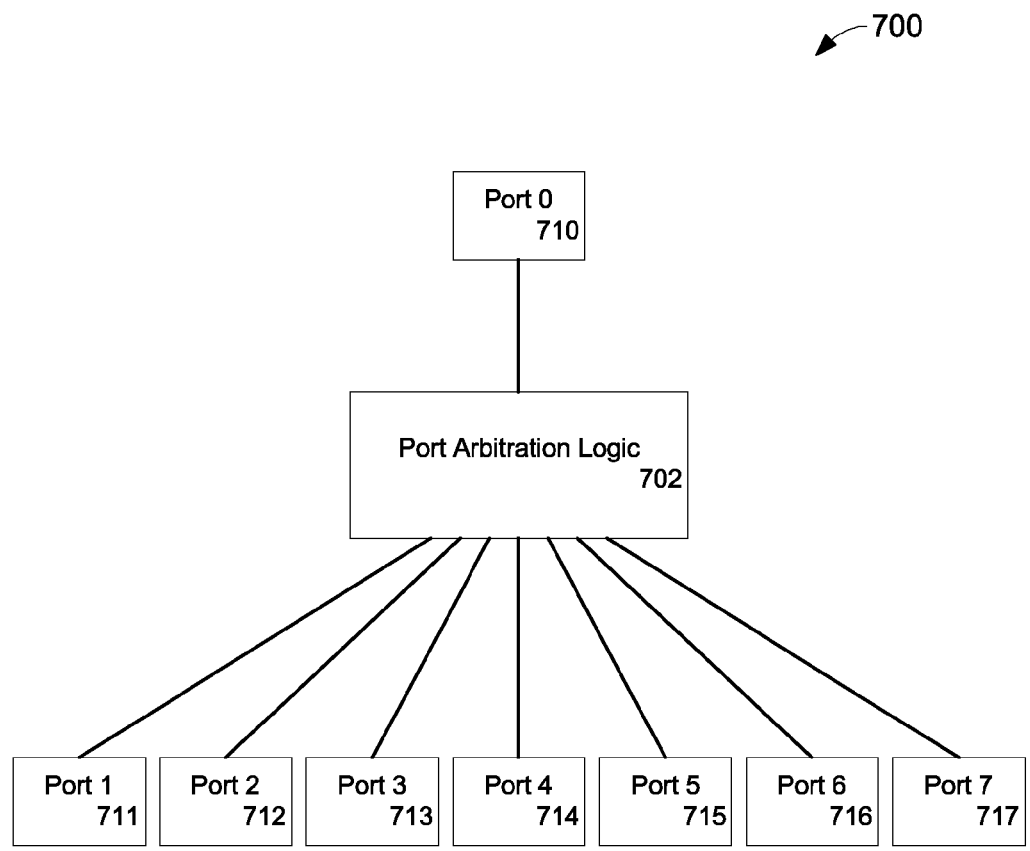
FIG. 7 illustrates one embodiment of the invention showing major blocks.

FIG. 7 illustrates, generally at 700, one embodiment of the invention showing major blocks. As described for a port 1 through port 7 transfer to port 0 upstream. Egress port 0 710 may be connected to an upstream root device (not shown). Ingress ports 1-7 (711-717 respectively) may be connected to data sources. Port Arbitration Logic 702 controls which of the ports 1-7 (711-717) is connected to port 0 710. Port arbitration (e.g. Port Arbitration Logic 702) is done based on the Phase Table and an arbitration scheme such as round robin (RR) or weighted round robin (WRR).

Figure 8:
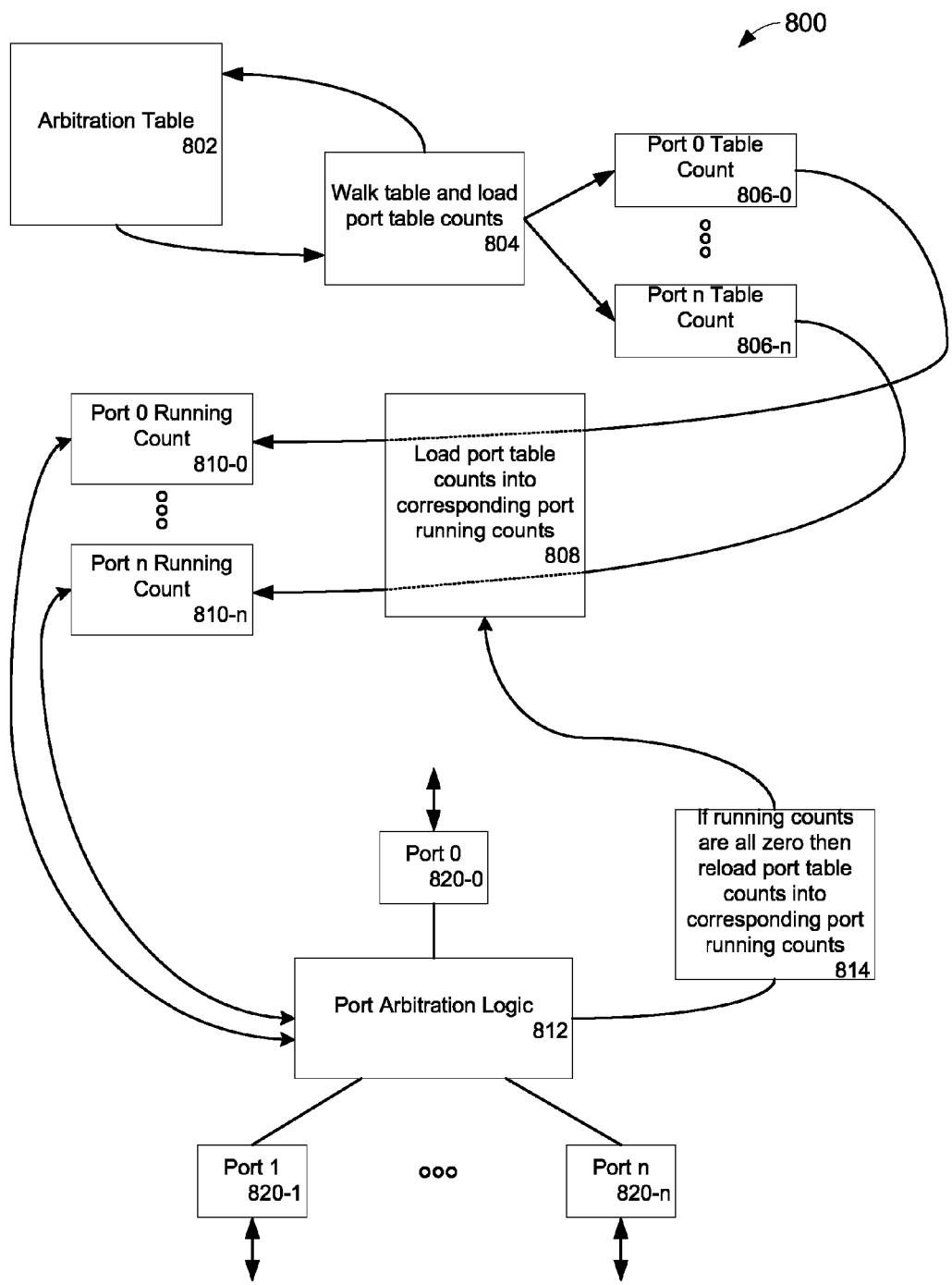
FIG. 8 illustrates one embodiment of the invention showing major blocks and operations.

FIG. 8 illustrates, generally at 800, one embodiment of the invention showing major blocks and operations. At 802 is an arbitration table 802 which is loaded by, for example, the operating system of a computer. At 804 the table is examined (walked) and respective port counts are put into port table count registers (Port 0 806-0 through Port n 806-*n* respectively). The port table counts (Port 0 806-0 through Port n 806-*n* respectively) are then copied to the respective port running counters (e.g. registers) (Port 0 810-0 through Port n 810-*n* respectively). The Port Arbitration Logic 812 then uses these running counters (810-0 through 810-*n*) to arbitrate and allow ports 1 through n (820-1 through 820-*n*) to connect to port 0 (820-0) in this example. At 814 if the running port counts are all zero then the port running counts 810-0 through 810-*n*) are reloaded 808 from the respective table counts (806-0 through 806-*n*). The port arbitration logic 812 continues to operate.

Note that in one embodiment of the invention, the port running counts are decremented as soon as a TLP (Transaction Layer Packet) is initiated. For example if the last running port count is for port 1 and a TLP starts transferring then a reload of all the running counters occurs while the port 1 to port 0 TLP (e.g. in FIG. 8) is happening. Thus, the port arbitration logic (e.g. 812 in FIG. 8) does not need to delay or stop. It may continue running at full speed.

One of skill in the art will appreciate that the Port Arbitration Logic (e.g. 812 in FIG. 8) may access the port running count registers or counters in a variety of ways to perform the arbitration. A round robin may be used as well as more logic.

Figure 9:
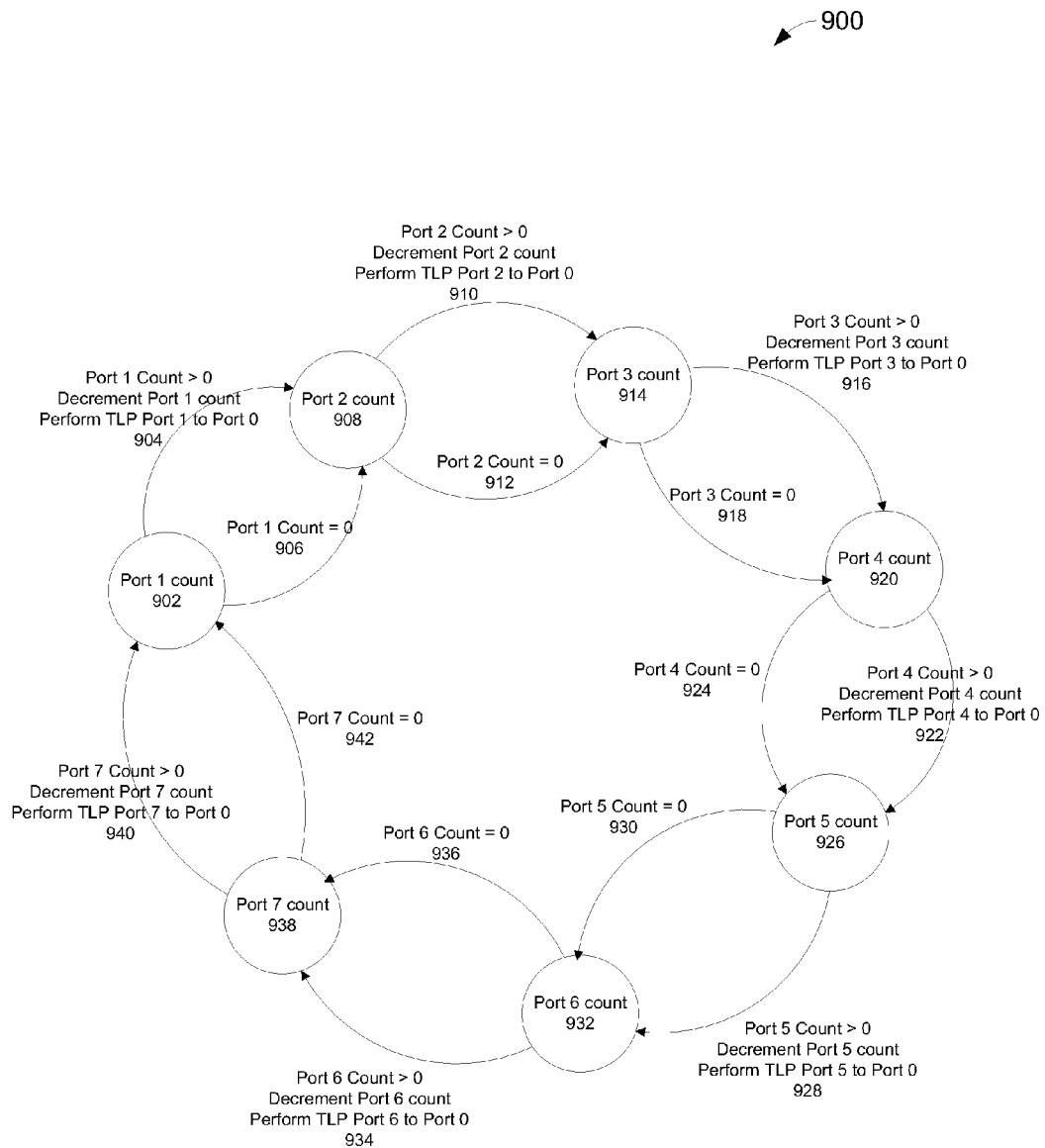
FIG. 9 illustrates one embodiment of the invention.

FIG. 9 illustrates, generally at 900, one embodiment of the invention. For example, a WRR having 32 phases and 8 ports implementation (e.g. FIG. 5) where Port 0 is a fixed egress port and ports 1-7 are ingress, results in 7 counters that may be accessed via a state machine as illustrated, generally at 900. Port 1 count (902) has two transition paths to Port 2 count (908). The first path is Port 1 count is greater than zero (904), in which case the Port 1 count (at 902) is decremented and a Port 1 to Port 0 TLP transfer occurs. The second path is where Port 1 count equals zero (906), in which case the logic transitions to 908 directly. In a similar fashion this process continues for Port 2 (908, 910, 912), Port 3 (914, 916, 918), Port 4 (920, 922, 924), Port 5 (926, 928, 930), Port 6 (932, 934, 936), and Port 7 (938, 940, 942) which then starts again at Port 1 (902).

One of skill in the art will appreciate that other variations are possible, for example, logic may be used to test, for example for Port 1 count and Port 2 count both being zero in which case a transition may be made directly from Port 1 to Port 3, skipping Port 2.

As described above, there may be scenario in which some port running counts are not zero and the respective ports are not requesting service, so the running counts are not decrementing, while at the same time there may be a port requesting service that has a running count of zero. Thus to prevent blocking from occurring, a reload of the running counts is done if there is a port requesting service with a zero count and there are no other ports with counts that are requesting service. This provides non-blocking TLP transfers.

Figure 10:
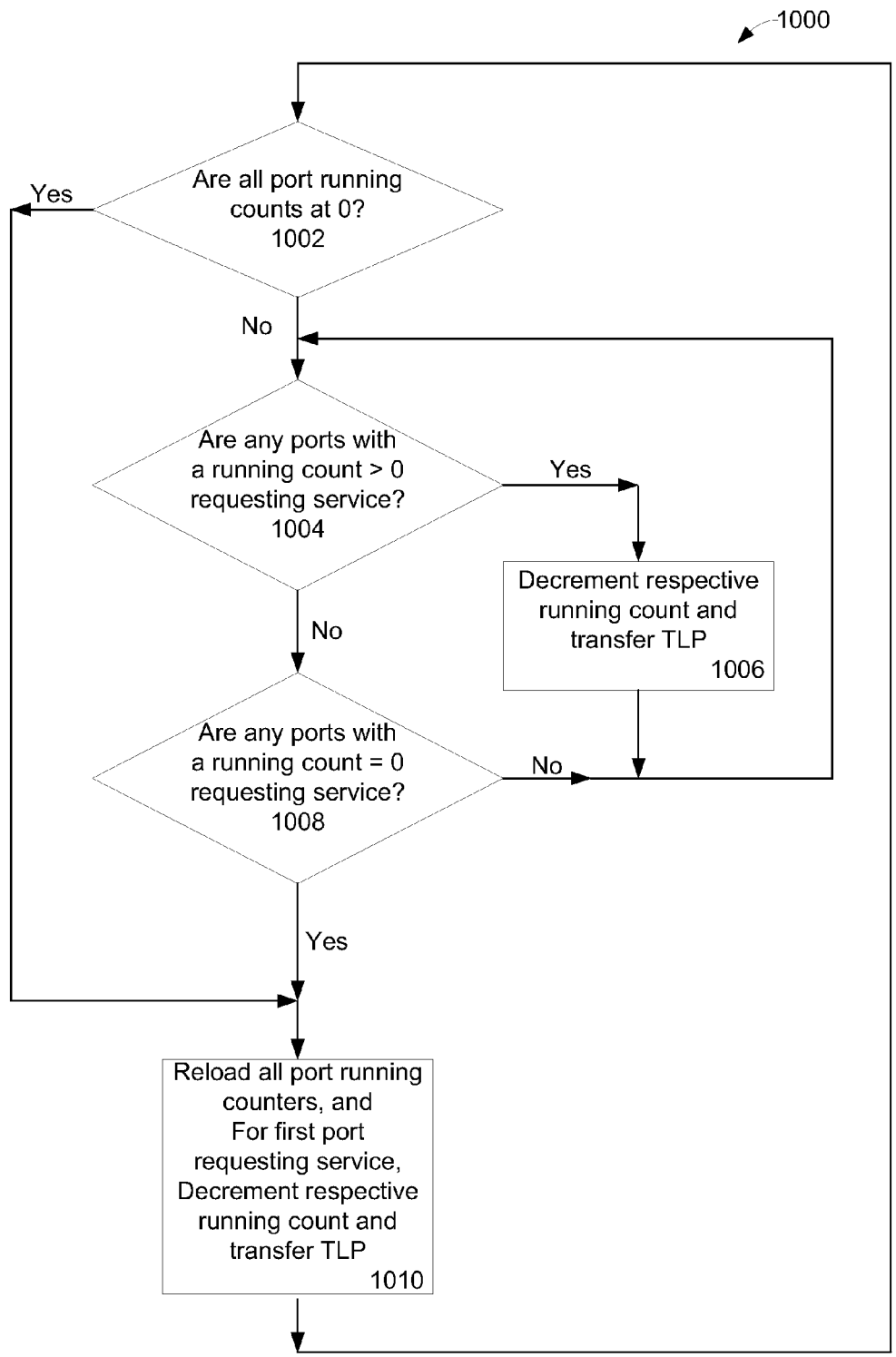
FIG. 10 illustrates one embodiment of the invention in flow chart form.

FIG. 10 illustrates, generally at 1000, one embodiment of the invention in flow chart form. At 1002 a check is made to see if all port running counts are at zero. If all port running counts are at zero then at 1010 all the port running counters are reloaded (e.g. FIG. 8, at 808, 810-0 to 810-*n*) and processing continues at 1002. If all port counts are not at zero at 1002, then at 1004 a check is made to see if any ports with a respective running counter having a count greater than zero are requesting service (e.g. TLP ready to transfer) and if so then at 1006 the respective running count is decremented and the TLP is transferred and processing then continues at 1004. If at 1004 no ports with a running count greater than zero are requesting service, then at 1008 a check is made to see if any ports with a count of zero are requesting service and if so (yes branch) than at 1010 the port running counters are reloaded, and the first port requesting service has its respective running count decremented and then the TLP associated with that port is transferred and then processing continues at 1002. If at 1008 if no ports with a running count of zero are requesting service then processing continues at 1004.

One of skill in the art will appreciate that as illustrated in FIG. 10, the embodiment is non-blocking. Additionally, one of skill in the art will understand that the logic of FIG. 10 may be placed into part of the arbitration logic, for example, it may be an embodiment for block 814 in FIG. 8.

Figure 11:
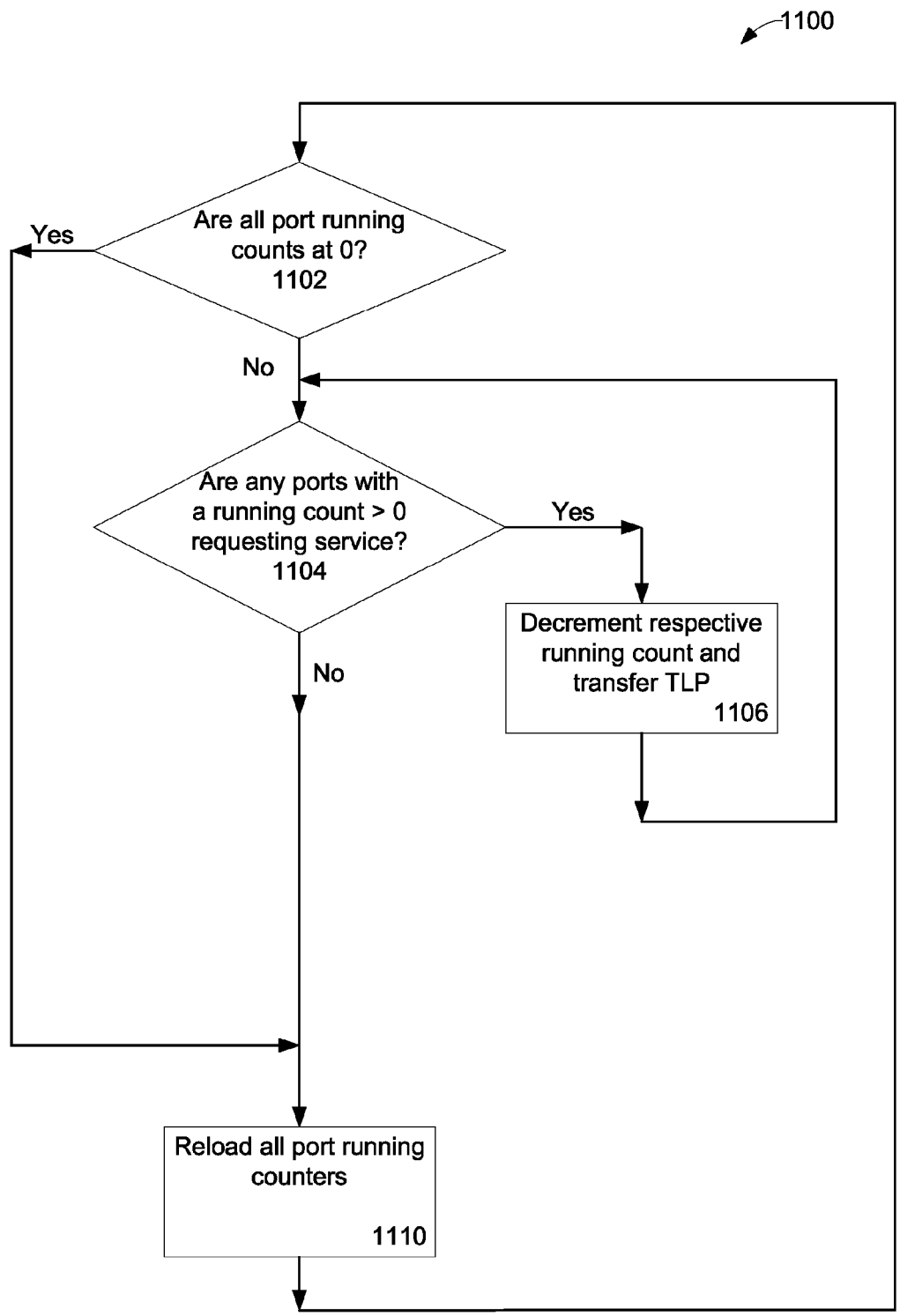
FIG. 11 illustrates one embodiment of the invention in flow chart form.

One of skill in the art will understand that there are other possible embodiments. For example, FIG. 11 illustrates, generally at 1100, another embodiment of the invention in flow chart form. At 1102 a check is made to see if all port running counts are at zero. If all port running counts are at zero then at 1110 all the port running counters are reloaded (e.g. FIG. 8, at 808, 810-0 to 810-n) and processing continues at 1102. If all port counts are not at zero at 1102, then at 1104 a check is made to see if any ports with a respective running counter having a count greater than zero are requesting service (e.g. TLP ready to transfer) and if so then at 1106 the respective running count is decremented and the TLP is transferred and processing then continues at 1104. If at 1104 no ports with a count greater than zero are requesting service, then at 1110 the port running counters are reloaded and processing continues at 1102. FIG. 11 as shown is a non-blocking embodiment. One of skill in the art will appreciate that the embodiment as illustrated in FIG. 11 has different latency and weighting than a strict walking of a phase table.

FIGS. 12A-F illustrates, generally at 1200, one embodiment of the invention showing RTL (register transfer level) code.

The description has used the term "decrementing" or similar terms to describe the invention. This was done as preloading a counter with a value and then decrementing it till it hits a count of 0 is easily understood. One of skill in the art will appreciate that rather than decrementing till one hits 0, one could just as easily load a count and increment a counter till it rolled over at which point it would hold a count of 0. Another variation is to load a count and increment or decrement it till it compares with a value at which a signal of comparison (=, >, <, < >, =>, <=) may be generated. What is to be understood is that the invention is not limited to decrementing alone and any approach which keeps track of a count may be used. Therefore decrementing is to be considered any of these approaches.

As used herein, the terms "to" and "up to" or similar language shall be understood to be inclusive of the end value(s). For example, zzaybe has up to 8 ports means zzaybe may have 8 ports. Similarly xxnoc may have 1 to 7 means xxnoc may be 1, 2, 3, 4, 5, 6, or 7.

As used herein, the terms "respective", "corresponding" or similar language shall be understood to relate to a similarly labeled entity. For example, the phrase "wwecox ports 1-7 are coupled to corresponding (or respective) qqncx ports" or ""wwecox ports 1-7 are coupled to corresponding (or respective) qqncx ports 1-7" means that wwecox port 1 is coupled to qqncx port 1, and wwecox port 2 is coupled to qqncx port 2, and so on through wwecox port 7 is coupled to qqncx port 7. This one to one relationship applies to ports, registers, etc.

Thus a method and apparatus for conversion of an arbitration table into count values to control the distribution of resources have been described.

Figure 1:
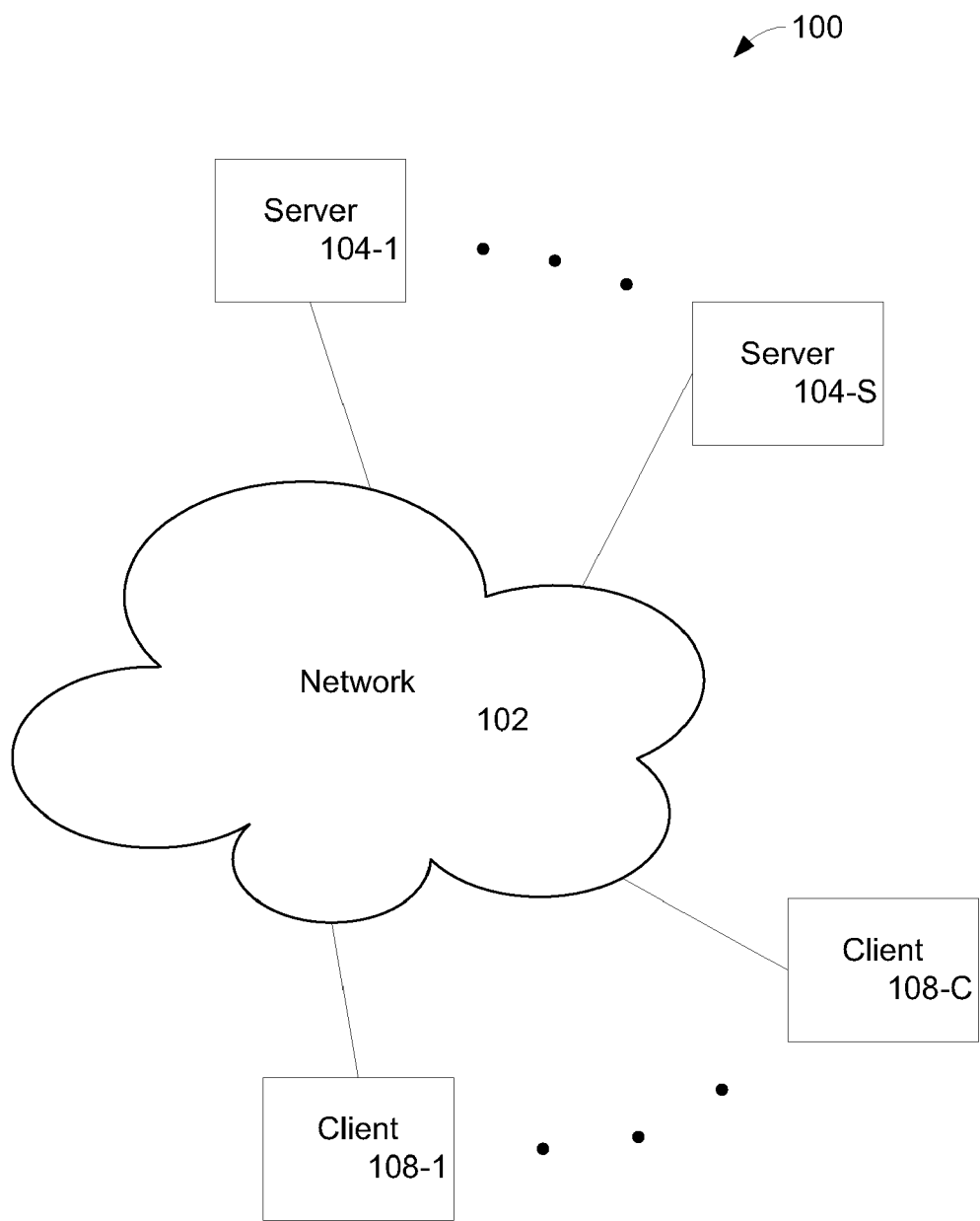
FIG. 1 illustrates a network environment in which the method and apparatus of the invention may be implemented.

FIG. 1 illustrates a network environment 100 in which the techniques described may be applied. The network environment 100 has a network 102 that connects S servers 104-1 through 104-S, and C clients 108-1 through 108-C. More details are described below.

Figure 2:
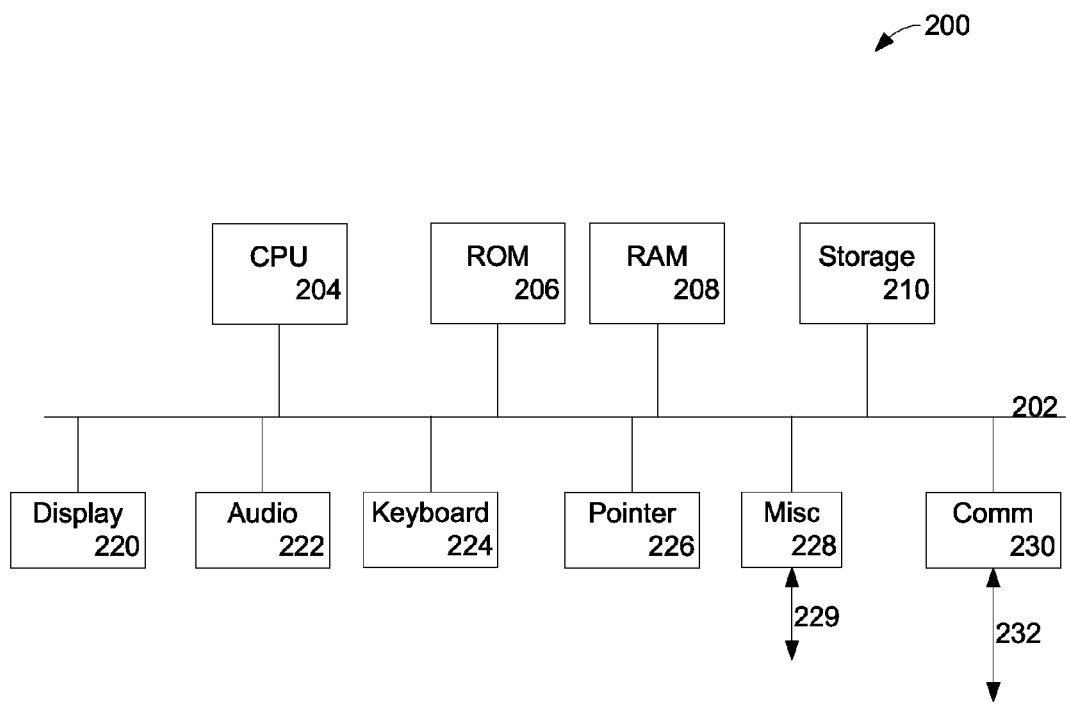
FIG. 2 is a block diagram of a computer system in which some embodiments of the invention may be used.

FIG. 2 is a block diagram of a computer system 200 in which some embodiments of the invention may be used and which may be representative of use in any of the clients and/or servers shown in FIG. 1, as well as, devices, clients, and servers in other Figures. More details are described below.

Referring back to FIG. 1, FIG. 1 illustrates a network environment 100 in which the techniques described may be applied. The network environment 100 has a network 102 that connects S servers 104-1 through 104-S, and C clients 108-1 through 108-C. As shown, several computer systems in the form of S servers 104-1 through 104-S and C clients 108-1 through 108-C are connected to each other via a network 102, which may be, for example, a corporate based network. Note that alternatively the network 102 might be or include one or more of: the Internet, a Local Area Network (LAN), Wide Area Network (WAN), satellite link, fiber network, cable network, or a combination of these and/or others. The servers may represent, for example, disk storage systems alone or storage and computing resources. Likewise, the clients may have computing, storage, and viewing capabilities. The method and apparatus described herein may be applied to essentially any type of communicating means or device whether local or remote, such as a LAN, a WAN, a system bus, etc. Thus, the invention may find application at both the S servers 104-1 through 104-S, and C clients 108-1 through 108-C.

Referring back to FIG. 2, FIG. 2 illustrates a computer system 200 in block diagram form, which may be representative of any of the clients and/or servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228, and communications 230. The bus system 202 may be for example, one or more of such buses as a system bus, Peripheral Component Interconnect (PCI), PCI Express (PCI-E, PCIe), Advanced Graphics Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Storage 210, may be Compact Disc (CD), Digital Versatile Disk (DVD), hard disks (HD), optical disks, tape, flash, memory sticks, video recorders, etc. Display 220 might be, for example, an embodiment of the present invention. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

An apparatus for performing the operations herein can implement the present invention. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk-read only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

A non-transitory machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices;

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

As used herein, the terms "comprising" and "containing" shall be understood to have a broad meaning similar to the term "including" and will be understood to be non-exhaustive and imply the inclusion of a stated integer or step or group of integers or steps but not the exclusion of any other integer or step or group of integers or steps. This definition also applies to variations on the terms "comprising" and "containing" such as "comprise", "comprises"; "contain" and "contains".

Thus a method and apparatus for conversion of an arbitration table into count values to control the distribution of resources have been described.

What is claimed is:

1. A method comprising:
examining a port arbitration table in a device capable of handling up to a number P of ports (0, 1, ..., P), said port arbitration table capable of specifying a number of entries for each of said P ports, and determining a total number of entries E for each of said P ports (0E, 1E, ..., PE);
loading into P table count registers (0TC, 1TC, ..., PTC) each respective said total number of entries for said P ports (0E-->0TC, 1E-->1TC, ..., PE-->PTC);
(a) copying each respective said P table count register (0TC, 1TC, ..., PTC) into a corresponding P running counter (0TC-->0RC, 1TC-->1RC, ..., PTC-->PRC);
(b) cycling through all P running counters (0RC, 1 RC, ..., PRC) one at a time and determining if said one P running counter is at a count of zero; and
(b1) if not at a count of zero then;
decrementing the count of said P running counter;
transferring a packet through said P port;
repeating (b)
(b2) if at a count of zero then;
determining if all said P running counters are at a count of zero; and
(b2a) if not at a count of zero then;
repeating (b)
(b2b) if at a count of zero then;
repeating (a)-(b).

2. The method of claim 1 wherein said determining a total number of entries E for each of said P ports further comprises:
resetting a group of P counters all to a count of zero;
looking at each entry in said port arbitration table and for said each entry incrementing by one a counter in said group of P counters corresponding to a port in said entry.

3. The method of claim 2 wherein said group of P counters and said P table count registers are the same.

4. The method of claim 1 wherein said (a) copying, occurs during a transfer of a TLP (Transaction Layer Packet).

5. A non-tranistory machine-readable medium having stored thereon instructions, which when executed performs the method of claim 1.

6. A system comprising a processor coupled to a memory, which when executing a set of instructions performs the method of claim 1.

7. An apparatus comprising:
means for examining in a device a port arbitration table capable of handling up to a number P of ports (0, 1, ..., P), said port arbitration table capable of specifying a number of entries for each of said P ports, and means for determining a total number of entries E for each of said P ports (0E, 1E, ..., PE);
means for loading into P table count registers (0TC, 1TC, ..., PTC) each respective said total number of entries for said P ports (0E-->0TC, 1E-->1TC, ..., PE-->PTC);
(a) means for copying each respective said P table count register (0TC, 1TC, ..., PTC) into a corresponding P running counter (0TC-->0RC, 1TC-->1 RC, ..., PTC-->PRC);
(b) means for cycling through all P running counters (0RC, 1 RC, ..., PRC) one at a time and means for determining if said one P running counter is at a count of zero; and
(b1) if not at a count of zero then;
means for decrementing the count of said P running counter;
means for transferring a packet through said P port;
means for repeating (b)
(b2) if at a count of zero then;
means for determining if all said P running counters are at a count of zero; and
(b2a) if not at a count of zero then;
means for repeating (b)
(b2b) if at a count of zero then;
means for repeating (a)-(b).

8. The apparatus of claim 7 wherein said means for determining a total number of entries E for each of said P ports further comprises:
means for resetting a group of P counters all to a count of zero;
means for looking at each entry in said port arbitration table and for said each entry means for incrementing by one a counter in said group of P counters corresponding to a port in said entry.

9. The apparatus of claim 8 wherein said group of P counters and said P table count registers are the same.

10. The apparatus of claim 7 wherein said (a) means for copying, occurs during a transfer of a TLP (Transaction Layer Packet).

11. A non-transitory machine-readable medium having stored thereon information, which when extracted represents the apparatus of claim 7.

12. A method comprising:
examining a port arbitration table in a device capable of handling up to a number P of ports (0, 1, ..., P), said port arbitration table capable of specifying a number of entries for each of said P ports, and determining a total number of entries E for each of said P ports (0E, 1E, ..., PE);
loading into P table count registers (0TC, 1TC, ..., PTC) each respective said total number of entries for said P ports (0E-->0TC, 1E-->1TC, ..., PE-->PTC);
(a) copying each respective said P table count register (0TC, 1TC, ..., PTC) into a corresponding P running counter (0TC-->0RC, 1TC-->1RC, ..., PTC-->PRC);
(b) determining a first port requesting service;
(c) decrementing a count of said first port corresponding running counter;
(d) transferring a packet through said first port requesting service;
(e) determining if all said P running counters are at a count of zero: and
(e1) if all said P running counters are at a count of zero then;
going to (a);
(e2) if all said P running counters are not at a count of zero then;
(e2a) determining if any of said ports P with a respective not at zero count are requesting service; and
(e2a1) if any of said ports P are requesting service then;
decrementing the count of said P running counter;
transferring a packet through said P port;
going to (e2a);
(e2a2) if none of said ports P are requesting service then;
(e2a2a) determining if any of said P ports with a respective running count of zero are requesting service; and
(e2a2a1) if any of said ports P with a respective running count of zero are requesting service then;
going to (a);
(e2a2a2) if none of said ports P with a respective running count of zero are requesting service then;
going to (e2a).

13. The method of claim 12 wherein said (e) determining further comprises cycling through all P running counters (0RC, 1 RC, ..., PRC) one at a time.

14. An apparatus comprising:

means for examining in a device a port arbitration table capable of handling up to a number P of ports (0, 1, ..., P), said port arbitration table capable of specifying a number of entries for each of said P ports, and means for determining a total number of entries E for each of said P ports (0E, 1E, ..., PE);

means for loading into P table count registers (0TC, 1TC, ..., PTC) each respective said total number of entries for said P ports (0E-->0TC, 1E-->1TC, ..., PE-->PTC);

(a) means for copying each respective said P table count register (0TC, 1TC, ..., PTC) into a corresponding P running counter (0TC-->0RC, 1TC-->1 RC, ..., PTC-->PRC);

(b) means for determining a first port requesting service;

(c) means for decrementing a count of said first port corresponding running counter;

(d) means for transferring a packet through said first port requesting service;

(e) means for determining if all said P running counters are at a count of zero: and (e1)) if all said P running counters are at a count of zero then;

means for going to (a);

(e2) if all said P running counters are not at a count of zero then;

(e2a) means for determining if any of said ports P with a respective not at zero count are requesting service; and (e2a1) if any of said ports P are requesting service then;

means for decrementing the count of said P running counter;

means for transferring a packet through said P port;

means for going to (e2a);

(e2a2) if none of said ports P are requesting service then;

(e2a2a) means for determining if any of said P ports with a respective count of zero are requesting service; and (e2a2a1) if any of said ports P with a respective count of zero are requesting service then; means for going to (a);

(e2a2a2) if none of said ports P with a respective count of zero are requesting service then; means for going to (b2a).

15. The apparatus of claim 14 wherein said (e) means for determining further comprises means for cycling through all P running counters (0RC, 1 RC, ..., PRC) one at a time.

* * * * *